(12) United States Patent
Marshall et al.

(10) Patent No.: US 6,765,379 B1
(45) Date of Patent: Jul. 20, 2004

(54) METHOD AND DEVICE FOR TESTING DISK DRIVE HEAD WHILE DIRECTING GAS ACROSS THE HEAD

(75) Inventors: Steven B. Marshall, Northborough, MA (US); Michael Mallary, Sterling, MA (US); Richard E. Martin, Worcester, MA (US)

(73) Assignee: Maxtor Corporation, Longmont, CO (US)

( * ) Notice: Subject to any disclaimer, the term of this patent is extended or adjusted under 35 U.S.C. 154(b) by 199 days.

(21) Appl. No.: 10/055,237

(22) Filed: Oct. 25, 2001

(51) Int. Cl.[7] .............................................. G01R 33/12
(52) U.S. Cl. ......................................... 324/210; 360/31
(58) Field of Search .............................. 324/514, 158.1, 324/210, 212; 360/97.02, 97.03, 31

(56) References Cited

U.S. PATENT DOCUMENTS

| 5,914,594 | A  | * | 6/1999 | Mian ........................... 324/210 |
| 6,057,975 | A  |   | 5/2000 | Yaeger et al. |
| 6,112,582 | A  |   | 9/2000 | Yao et al. |
| 6,178,059 | B1 | * | 1/2001 | Frees ...................... 360/97.02 |

* cited by examiner

Primary Examiner—Walter E. Snow
(74) Attorney, Agent, or Firm—David M. Sigmond

(57) ABSTRACT

Methods and devices are provided that allow heads for use in disk drives to be tested in a helium environment in a cost-effective way with little or no impact on test time and with minimal consumption of helium.

62 Claims, 8 Drawing Sheets

METHOD AND DEVICE FOR TESTING DISK DRIVE HEAD WHILE DIRECTING GAS ACROSS THE HEAD

TECHNICAL FIELD

This invention relates to methods and devices for testing heads for use in sealed hard drive assemblies.

BACKGROUND

Hard drive assemblies (HDAs), otherwise known as disk drives, are commonly used for mass storage of computer programs and data. Magnetic recording media ("disks") are coated with a magnetic material. Data is stored ("written") on a disk by magnetizing spots on the coating with changes in polarity corresponding to binary bits.

Referring to FIG. 1, the data is written and read by spinning the disk 10 while a magnetic head 12, mounted on a load beam 16, "flies" over the upper surface 18 of the disk. The head (a hydrodynamic air bearing slider) flies as a result of a gliding action caused by compression of a layer of air that is dragged along by the spinning disk surface. The air layer is compressed between the upper surface 18 of the disk and the adjacent lower, air-bearing surface 20 of the head.

The head flies very close to the surface of the disk, without touching the disk surface. Referring again to FIG. 1, the distance H between the lower, air-bearing surface 20 of the head 12 and the upper surface 18 of disk 10 is referred to as the "flying height".

Recently, proposals have been made to design sealed hard drive assemblies (HDAs) that enclose a pure helium atmosphere. It is necessary to test heads that are to be used in sealed HDAs using standard single head dynamic electrical testing (DET). Because the environment in which a head is used affects the way that it will perform, e.g., by changing the flying height of the head, testing should be done with the head in a helium atmosphere.

Heads can be tested in a helium atmosphere by putting a hermetic chamber around the DET tester and filling it with helium. However, almost all DET testers use air bearing spindles that exhaust air, and thus the tester tends to contaminate the helium atmosphere in the chamber. Running the spindle with helium instead of air requires a heavy consumption of helium. The exhaust from the spindle could be ducted outside of the chamber, but this would be mechanically difficult to retrofit onto most common spinstands.

The chamber approach also requires that parts to be tested be transferred into and out of the chamber. Most production DET loads the heads onto the tester manually, so some form of access into the chamber must be provided. Opening the chamber is undesirable due to the loss of helium (typically on the order of several cubic feet), increasing the production cost of the heads. Moreover, purging the air and refilling the chamber with helium is time consuming. Test time in mass production is very expensive, costing on the order of tens of thousands of dollars per second (i.e., one second of test time is equivalent to several tester-months per program), and thus lost time also significantly increases the cost of the heads.

SUMMARY

The invention provides methods and devices that allow heads to be tested in a helium environment in a cost-effective way with little or no impact on test time and with minimal consumption of helium. In some implementations, the helium environment adds only a penny or less to the cost of a sealed drive.

In one aspect, the invention features a method of testing a head to be used in a sealed disk drive, including directing a flow of a gas across the head while subjecting the head to electrical testing.

Some implementations may include one or more of the following features. The gas includes helium. The method further includes causing the gas to flow between the head and a disk that is being used in the electrical testing. The method further includes causing the gas to flow out of a manifold. The method includes causing the gas to flow at a flow rate of from about 40 to 60 ft$^3$/hr. The method further includes causing the gas to flow across the head for a predetermined time substantially equal to the time required for dynamic electrical testing, e.g., less than 30 seconds, typically less than 15 seconds. The manifold includes an exit through which the gas flows, and the method further includes positioning the exit from about 0.005 to 0.010 inch above the surface of a disk that is being used in the electrical testing. The head and equipment used for electrical testing are exposed to the ambient atmosphere. The electrical testing comprises dynamic electrical testing. The head is surrounded by a shroud.

In another aspect, the invention features a device for testing a head to be used in a sealed disk drive to read/write data of a storage disk. The device includes a manifold having at least one opening for providing a flow of gas from a source of gas, the at least one opening being positioned to direct the flow of gas to a surface of a storage disk positioned adjacent to the head.

Other features and advantages of the invention will be apparent from the description and drawings, and from the claims.

DETAILED DESCRIPTION

Figure 1:
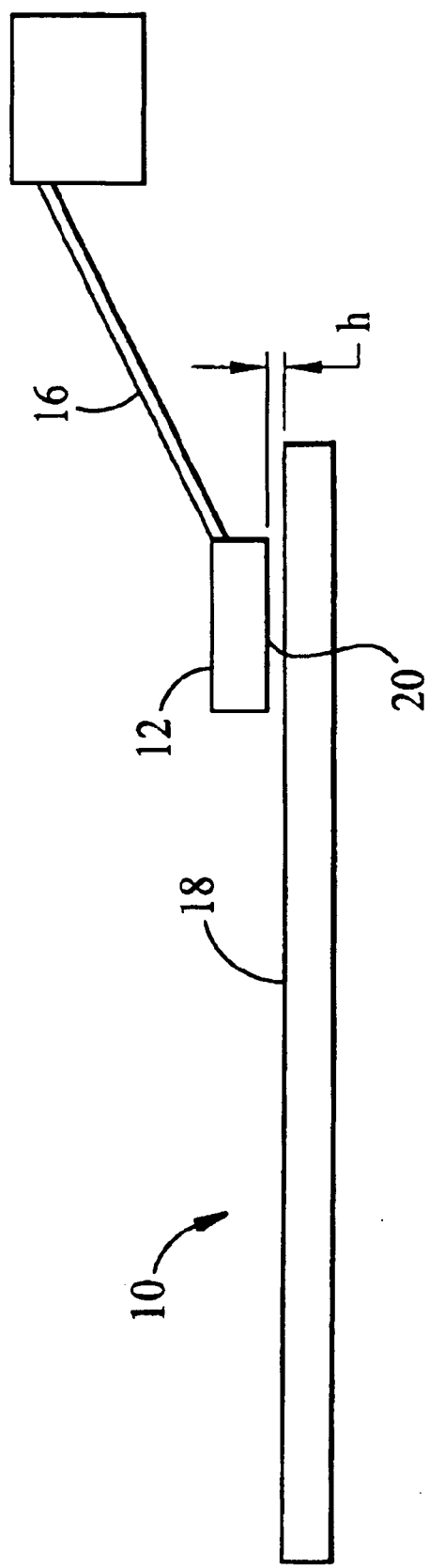
FIG. 1 is a diagrammatic side view of a disk and magnetic head.
Figure 1A:
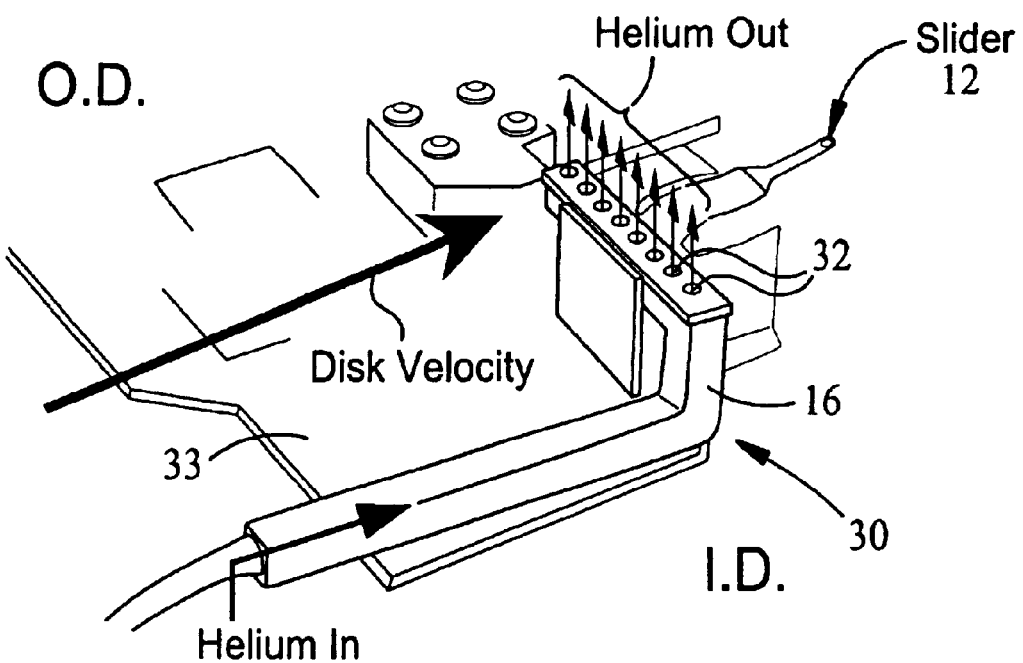
FIG. 1A is a diagrammatic perspective view of a helium injection manifold on a Guzik HGA holder.

FIG. 1A shows a manifold 30 for providing a helium layer between the air bearing surface 20 of a head (or "slider") 12 and the surface 18 of disk 10 (FIG. 1; the direction of disk movement is indicated in FIG. 1A by the arrow labeled "Disk Velocity".) The manifold 30 is mounted on a Guzik Head Gimbal Assembly (HGA) holder 33. The helium layer 34 (FIG. 2) is localized to the slider-disk boundary layer. The helium is delivered through square tubing 16, e.g., brass tubing. Helium is fed from the lower left (the area labeled "Helium In").

Figure 2:
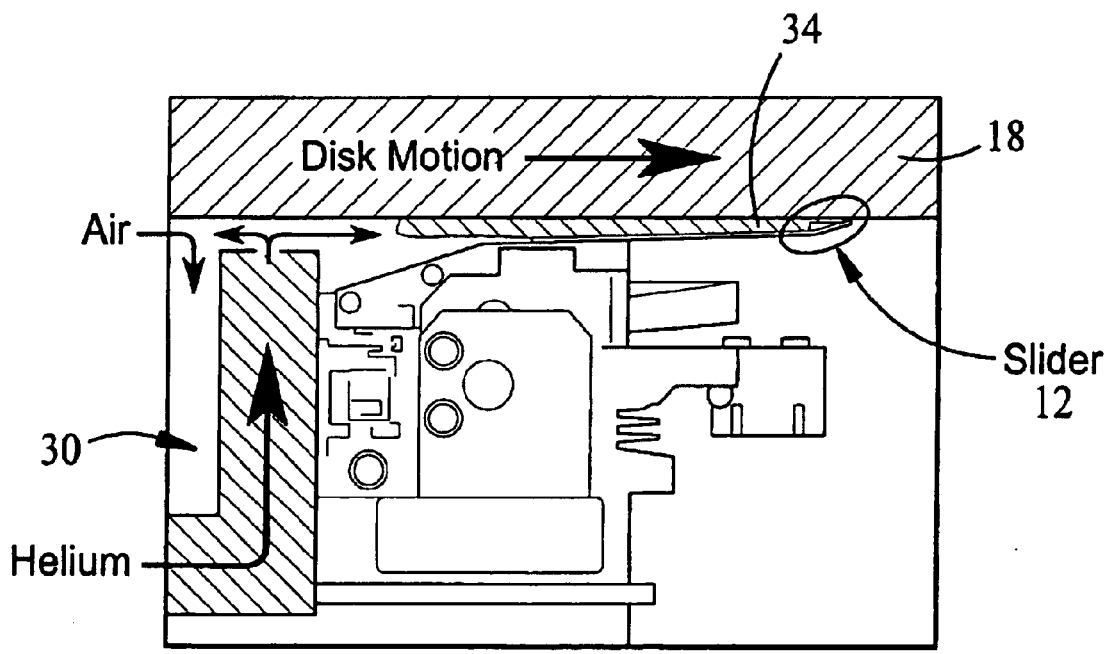
FIG. 2 is a schematic view indicating the path of helium flow under a slider.

Helium exits the manifold 30 through apertures 32. The area labeled "Helium Out", when mounted on a dynamic electric tester, is generally about 0.005 to 0.010 inch above the disk surface. The apertures 32 direct the helium flow at the disk surface, forming a "curtain" that excludes the air coming in from the direction of "Disk Velocity" (the air that is generated by the air bearing surface of the slider). The motion of the disk then "drags" the helium under the slider, as illustrated in FIG. 2. The apertures preferably have a diameter of from about 0.0465" (#56 drill) to 0.0625" (1/16"). The size of the apertures, the spacing between the apertures and the number of apertures will determine the relationship between the pressure and flow rate that has to be supplied to the manifold, and the efficacy of the manifold to both supply a sufficient flow of helium to support the slider and also to block the incoming air from mixing with the helium under the slider.

Preferably, the flow rate of helium from the manifold is from about 40 to 60 ft$^3$/hr. If the flow rate is too low, air may be admitted into the helium bearing under the slider, increasing the fly-height. If the flow rate is too high, the pressure of the helium under the slider may increase, increasing the fly-height. Too high a flow rate could also produce more turbulence around the slider resulting in increased Non-repeatable Run-out (NRRO) which is an inability of the slider to remain perfectly above the track under test.

EXAMPLES

Example 1
Saturation Curves Indicating FH Reduction

In order to verify that manifold 30 generates a helium layer between the slider and disk, read/write tests were performed to measure the flying height, to determine whether the flying height was reduced to the level that would occur in a helium atmosphere.

Figure 3:
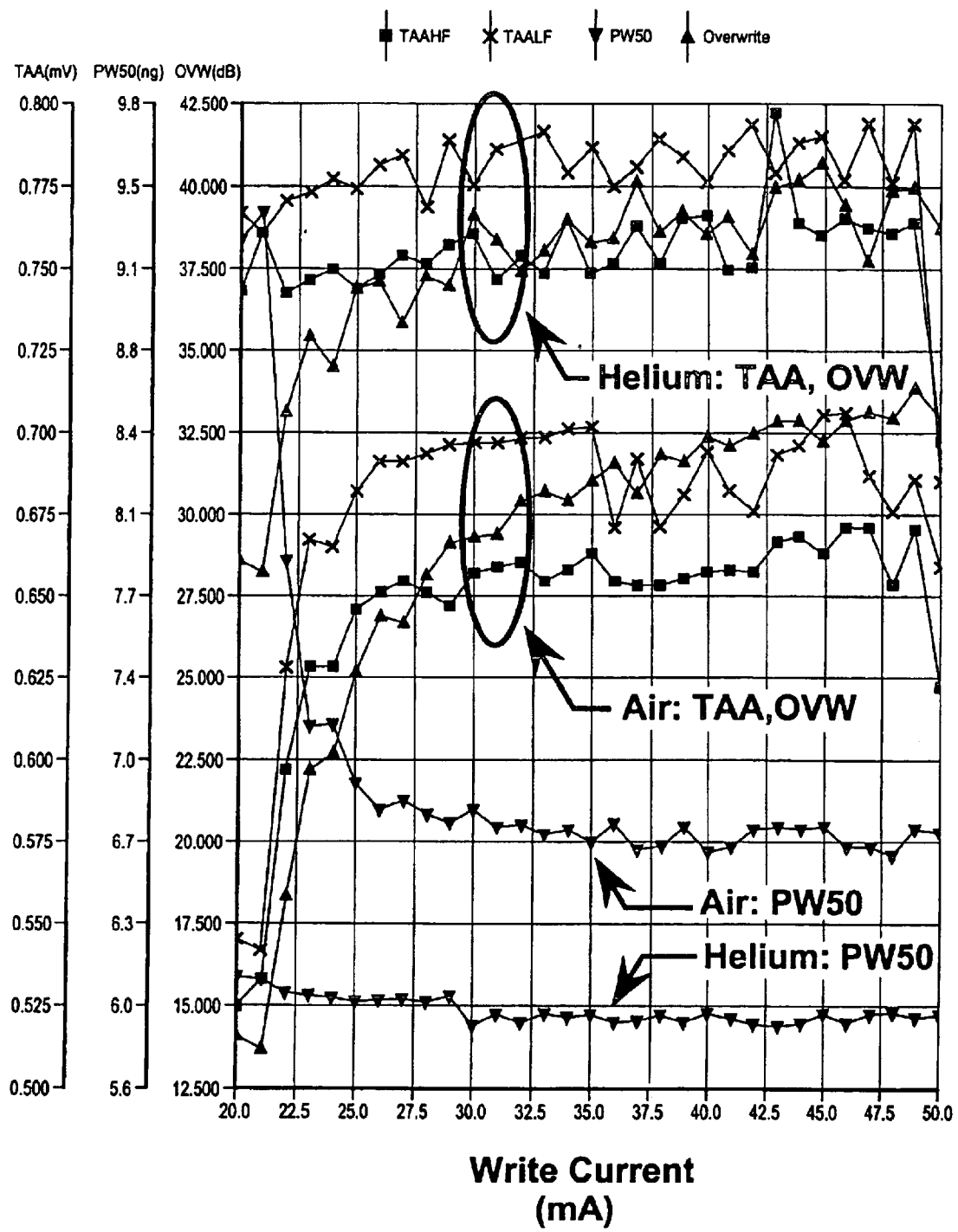
FIG. 3 is a graph including saturation curves in air and with helium injection.

FIG. 3 shows several "Saturation Curves" plotting readback measurements that were taken as a function of write current. These measurements were taken using DET equipment. The parameters measured were Track Average Amplitude (TAA) measured at a High Frequency (HF) and at a Low Frequency (LF, one-sixth of HF), Pulse-width at the 50% amplitude point (PW50) and Overwrite(OVW). TAA is a well-accepted measurement for characterizing disk drives, used to measure the efficiency of the read channel, determine the signal range required in a drive design, and provide a reference for other test methods. TAA is a parametric test for providing an average peak-to-peak amplitude measurement of equally spaced transitions of a read channel. (See, e.g., IDEMA Standards Test Methods, Document No. T3-91.) These measurements were taken first at normal atmospheric conditions, and then again with helium flowing through the manifold 30 at a rate of approx. 50 ft$^3$/hr. (approx 0.4 liters/sec.). A very clear change in parametrics was observed due to the helium flow. TAA and OVW both increased, while PW50 decreased. These changes are consistent with a reduction of flying height due to helium replacing air as the gas bearing under the slider.

Example 2
Estimation of Flying Height Change Using Wallace Spacing Loss Equation The change in amplitude at HF can be used to estimate the change in flying height according to the equation:

$$A_2 = A_1 \cdot \exp(-2\pi[d_2 - d_1]/\lambda)$$

$$d_{air} - d_{he} = \frac{-\lambda \cdot \ln(A_{air}/A_{he})}{2\pi}$$

Where the $A_n$ terms are the measured amplitudes and the $d_n$ terms are the respective flying heights. This equation was used to determine the change in flying height that could be expected using manifold 30 to deliver helium, as compared to the flying height in air. The following table presents the tester setup that was used, the measurements that were taken, and the results of applying the above equation. The wavelength is calculated by dividing the media velocity by the frequency of the written pattern. The media velocity is calculated from the radius of the track and the angular velocity (rpm) of the disk. The other terms in the Test Condition table were derived as follows: test_radius=id+ (max_trk-test_trk)*trk_pitch; linear_velocity= 2*pi*test_radius*spindle_velocity/60; density= 2*frequency/linear_velocity; wavelength=2/density.

TABLE 1

| Tester Setup | |
| --- | --- |
| id | 0.73 in |
| trk pitch | 31 μin |
| max trk (id) | 20268 |
| spindle velocity | 10000 rpm |

| Test Condition | |
| --- | --- |
| test trk (0 = od) | 0 |
| test radius | 1.358308 in |
| linear velocity | 1422.417 ips |
| frequency | 175 MHz |
| density | 246.1 kfci |
| wavelength (λ) | 8.12810 μin |

| Amplitude Measurement | |
| --- | --- |
| $A_{he}$ | 270.2 μV |
| $A_{air}$ | 200 μV |

| Fly-Height-Change | |
| --- | --- |
| $d_{air} - d_{he}$ | 0.39 μin |

This test was repeated with the HGA holder 33 in a helium filled tent in order to compare the change in flying height that would result from using manifold 30 with the change that would result from using the helium filled enclosure, and thereby determine the quality of the helium bearing provided by the manifold 30. The enclosure was approximately two feet wide, three feet deep, and one foot high. The tent was filled with helium and the proportion of residual oxygen was monitored. The oxygen content was reduced to about 5% from its normal 20%. The residual 5% oxygen was mainly due to air introduced to the chamber by the air bearing spindle; a high flow of helium would be required to eliminate the air.

TABLE 2

| Amplitude Measurement | | |
| --- | --- | --- |
| | tent (5% O$_2$) | manifold |
| $A_{he}$ | 260.15 | 267.38 μV |
| $A_{air}$ | 190 | 189.87 μV |

| Fly-Height-Change | | |
| --- | --- | --- |
| $d_{air} - d_{he}$ | 0.41 | 0.44 μin |

The manifold performed as well as the tent and possibly slightly better at reducing the flying height.

Example 3
Helium Injection Nozzle: Effect on T.M.R.

Figure 4:
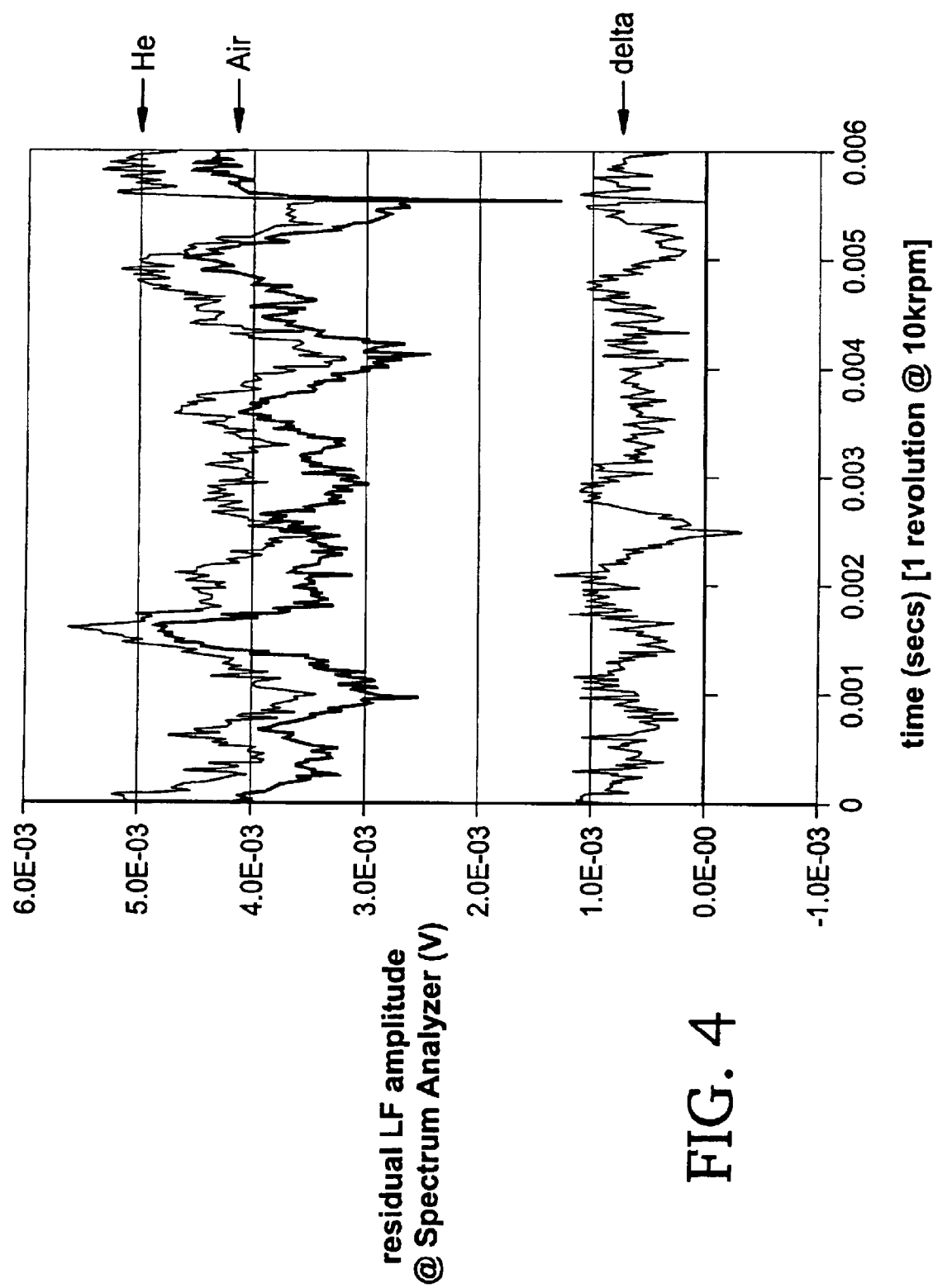
FIG. 4 is a Spectrum Analyzer trace of residual low frequency (LF) after overwrite (OVW).

Track Mis-Registration (TMR) with and without the helium flow was characterized by measuring residual LF signal after being overwritten by HF with the reader centered over edge of track. The track was first written with the LF pattern and then overwritten by HF in air. The residual LF was then measured with a spectrum analyzer configured to measure at only the fundamental frequency of the LF in air and then again with helium flow. The spectrum analyzer trace was triggered by the spindle index. The reader was positioned over the edge of the track as determined by a track profile of the residual LF. FIG. 4 plots the "once around the revolution" amplitudes for the case of air, helium, and the difference between the two.

The difference in amplitude is due to the lower fly-height in helium. The modulation is due to Non-Repeatable Run-out (NRRO). The NRRO is very similar for both helium and air. Table 3 analyzes the statistics of both traces.

TABLE 3

|  | He | Air |
|---|---|---|
| Mean | 0.004293 | 0.003612 |
| Standard Error | 0.000029 | 0.000028 |
| Median | 0.004266 | 0.003548 |
| Mode | 0.004198 | 0.003475 |
| Standard Deviation | 0.000504 | 0.000486 |
| Sample Variance | 2.54E − 07 | 2.36E − 07 |
| Kurtosis | 3.296043 | 1.237789 |
| Skewness | −0.455148 | −0.026398 |
| Range | 0.004310 | 0.003564 |
| Minimum | 0.001300 | 0.001300 |
| Maximum | 0.005610 | 0.004864 |
| Sum | 1.292291 | 1.087269 |
| Count | 301 | 301 |
| Confidence Level (95.0%) | 5.71E − 05 | 5.51E − 05 |

Figure 5:
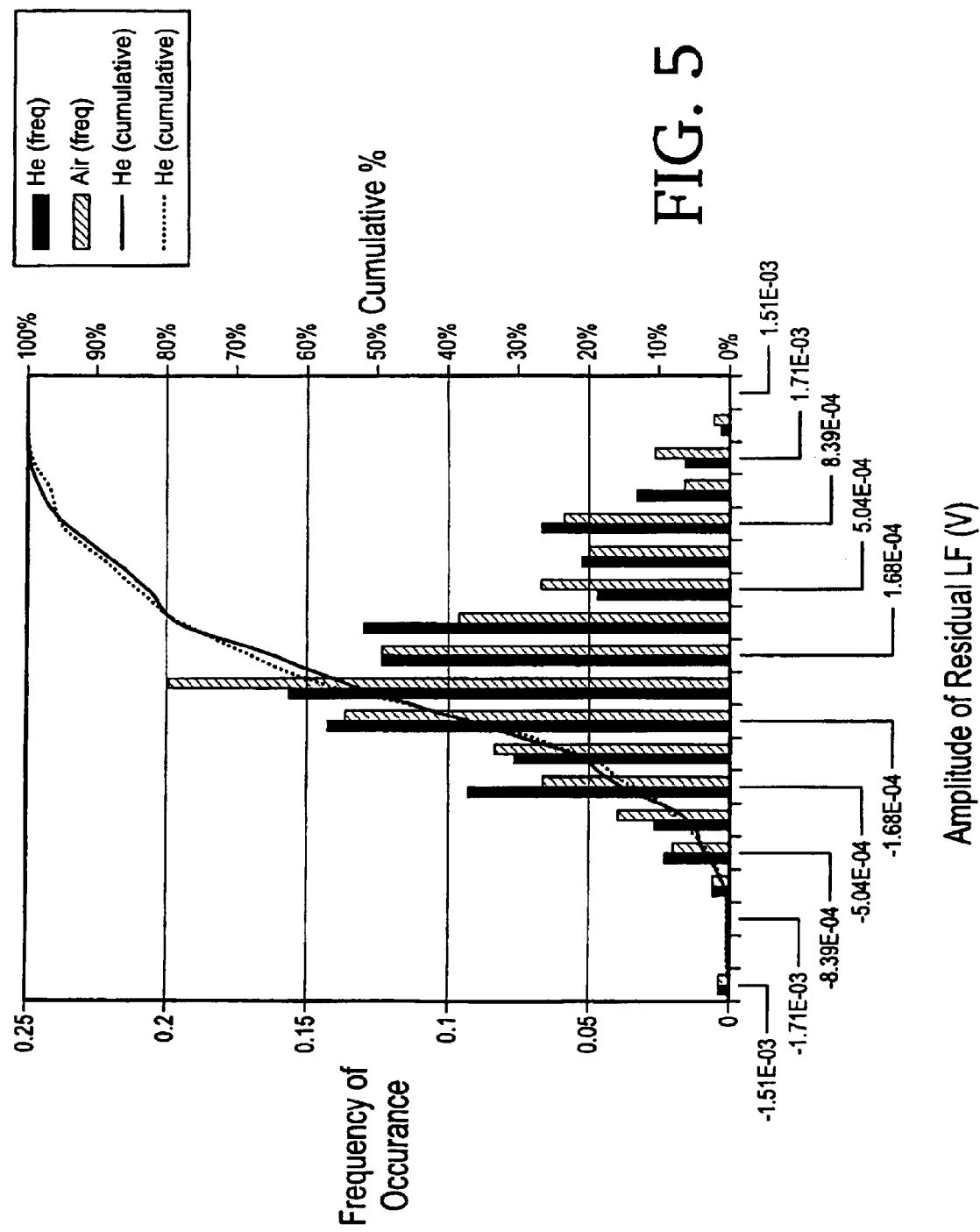
FIG. 5 is a histogram of the LF amplitude from the traces in FIG. 4, normalized for amplitude.

FIG. 5 is a histogram of the LF amplitude from the traces in FIG. 4, normalized for amplitude. The two are very close, indicating that the helium flow is having very little impact on TMR performance.

Example 4
Helium Cost for Prototype Manifold

The flow rate of helium in the previous experiments was approximately 50 cubic feet per hour (approx. 0.4 liters per second). In mass production typical DET test time is less than 30 seconds of actual on-disk time, and in fact most tests can be performed in less time than that. Assuming the helium only needs to flow for 15 seconds per head, the volume of helium required is about 0.2 ft$^3$ (5.7 liters) per head. This is summarized in Table 4.

TABLE 4

| Helium Consumption Estimate | | | |
|---|---|---|---|
| helium flow rate | 48.13 cu. ft./hr | 0.3785 | liters/sec |
| test-time per head |  | 15 | sec |
| helium per head | 0.2005 cu-ft. | 5.678 | liters |

The next table (Table 5) breaks down the cost of this volume of helium based on 2 types of purchase; small quantities delivered in 4 foot tall steel bottles, and large volume delivered in a truck sized tank.

TABLE 5

| Cost Estimate (@ 2 cu-ft per head) | | |
|---|---|---|
| container | bottle | truck |
| volume | 291 | 45000 cu-ft |
| @ | $34.36 | $7.50 per 100 cu-ft |
| cost per container | $100.00 | $3,375.00 |
| heads/container | 1,451.37 | 224,438.90 |
| cost per head | $0.069 | $0.015 |

It may be possible to reduce this cost even further. The easiest approach would be to reduce the time that the helium is flowing. There are only a few parameters in DET testing that are critically dependent on flying height. Using the manifold 30, the helium flow can be isolated to just those tests that are dependent on flying height, reducing consumption to just a few seconds.

Figure 6:
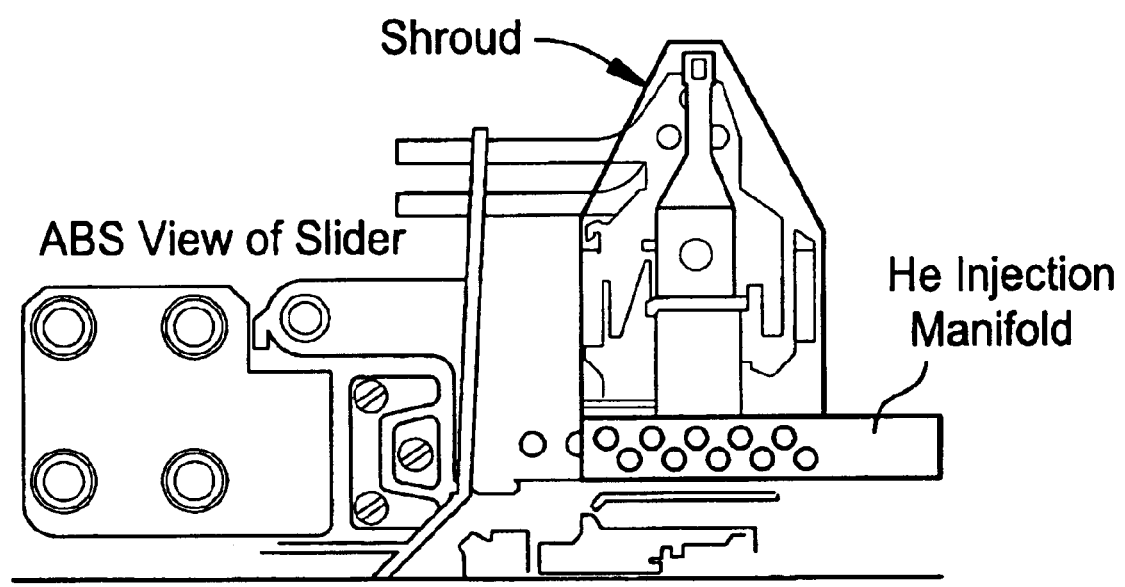
FIG. 6 is a diagrammatic view showing the helium injection manifold of FIG. 1 used with an optional shroud.

The flow rate may be reduced by trapping the helium around the HGA by means of a small "shroud" placed around the HGA, as illustrated in FIG. 6. For example, one suitable shroud design is approximately 1 inch wide, 1 inch long and about 0.156" thick, and has a polygonal shape similar to "home plate" used in baseball.

Other embodiments are within the scope of the following claims.

Figure 7:
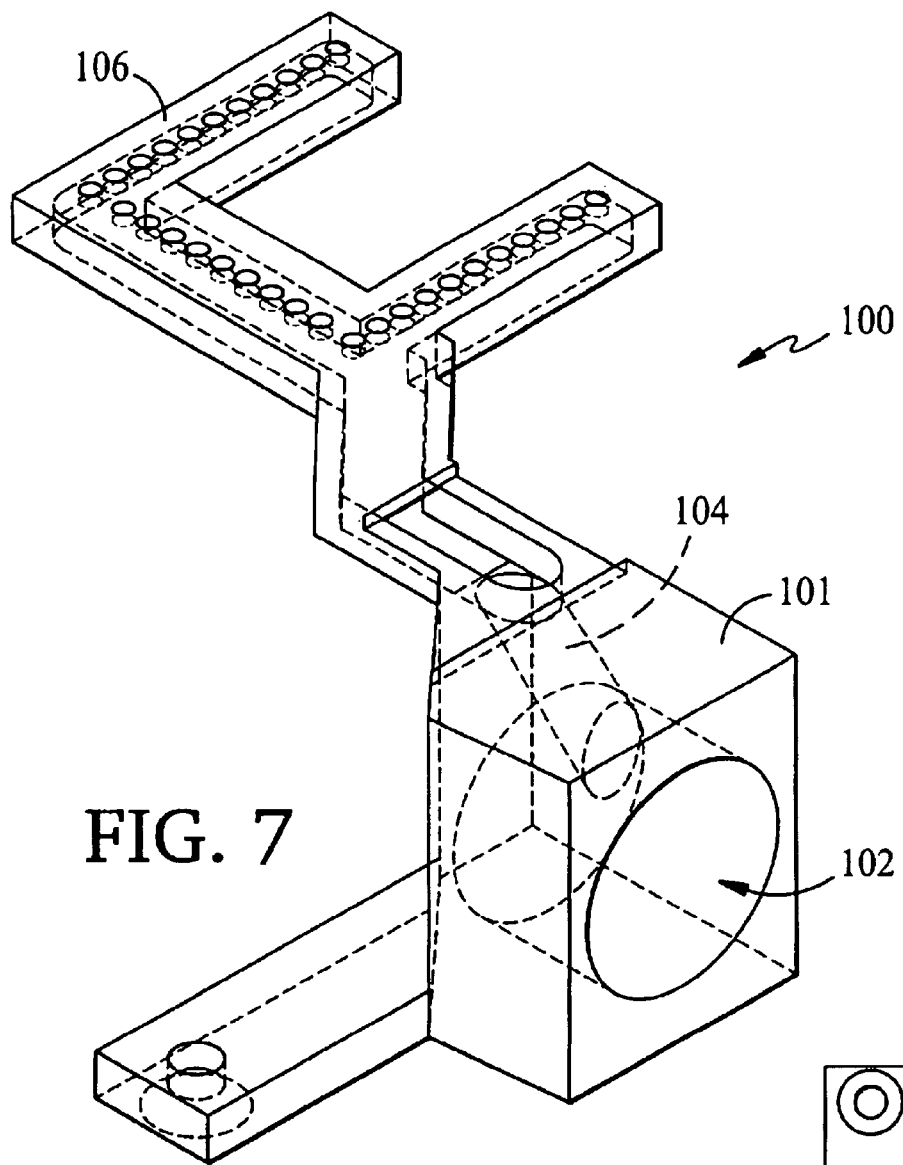
FIGS. 7–7C are perspective, top, and side views of a helium injection manifold according to an alternate embodiment of the invention.
Figure 7A:
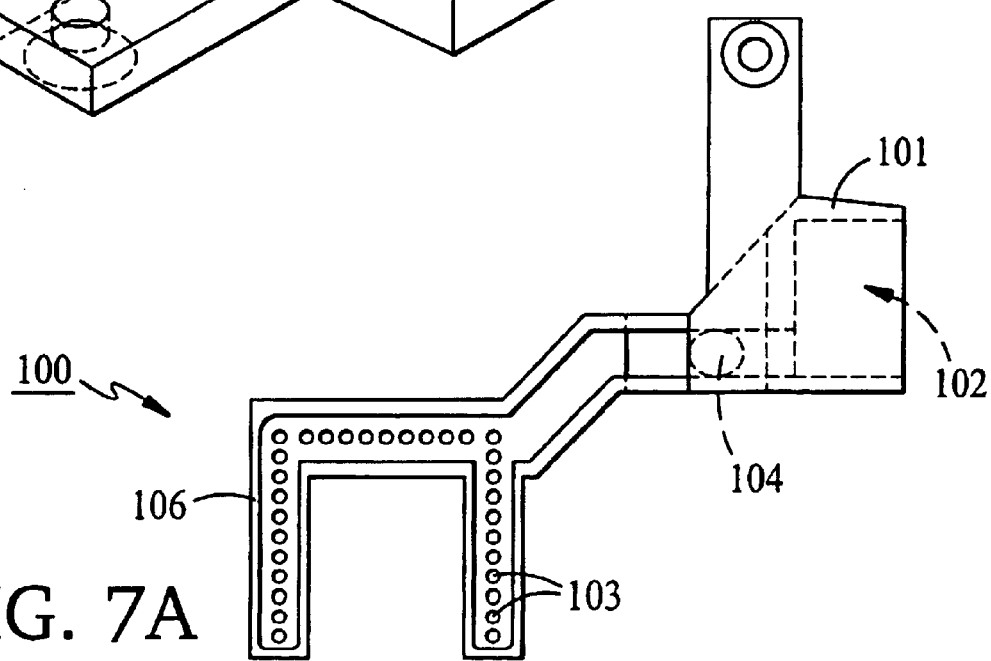
Figure 7B:
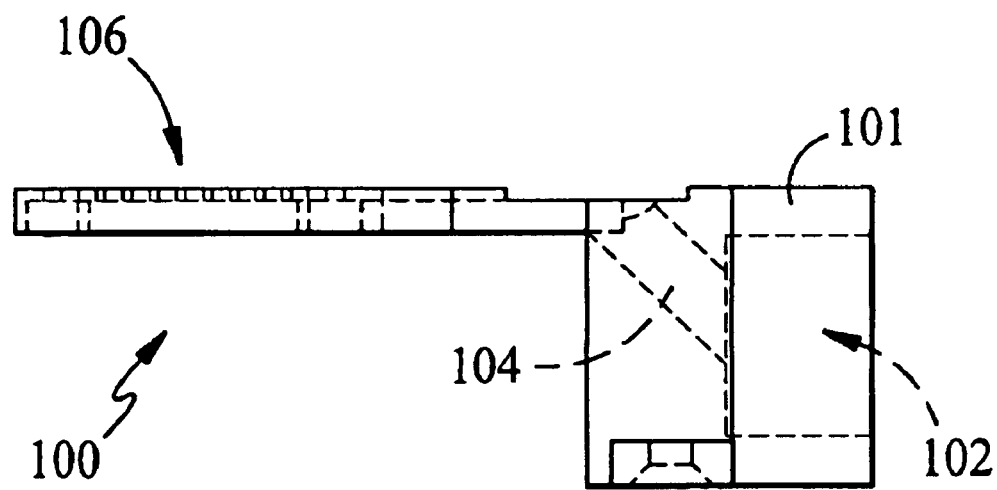
Figure 7C:
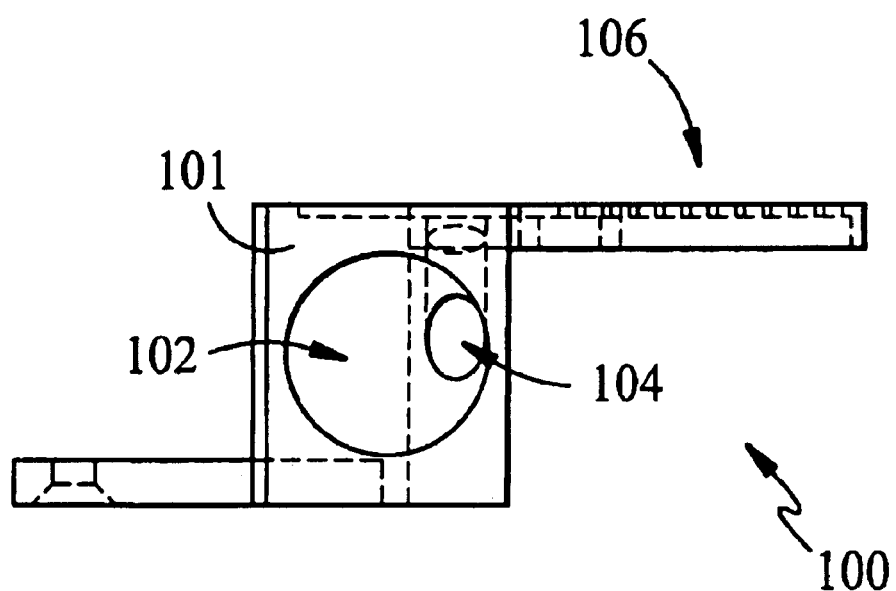

For example, an alternate manifold configuration is shown in FIGS. 7–7C. Manifold assembly 100 includes a body 101 having an inlet 102 constructed to receive a fitting for delivery of gas to the manifold. Inlet 102 may be threaded to allow the fitting to be screwed onto the manifold assembly. Inlet 102 is in fluid communication with an angled bore 104 which is constructed to deliver gas from the inlet 102 to the U-shaped manifold 106. Bore 104 extends at an angle. The U-shaped manifold 106 includes a plurality of apertures 108, through which gas is delivered to the disk surface. Angled bore 104 is preferably formed by machining a trough in the body 101, and covering the trough with a cover that is secured in place, e.g., with adhesive. This two-part construction allows the manifold assembly to be relatively small and have a low profile, allowing the manifold assembly to fit in the fixturing that holds the HGA on different testers, both DET and fly-height testers.

Moreover, while helium has been used as the gas in the detailed description above, other gases may also be used in the methods and devices described herein.

What is claimed is:

1. A method of testing a head to be used in a sealed disk drive, comprising directing a flow of a gas across the head from a source of the gas that is spaced from the head while subjecting the head to electrical testing.

2. The method of claim 1 wherein the gas comprises helium.

3. The method of claim 1 further comprising causing the gas to flow between the head and a disk that is being used in the electrical testing.

4. The method of claim 1 further comprising causing the gas to flow out of a manifold.

5. The method of claim 1 further comprising causing the gas to flow at a flow rate of from about 40 to 60 ft$^3$/hr.

6. The method of claim 1 further comprising causing the gas to flow across the head for a predetermined time substantially equal to the time required for the electrical testing.

7. The method of claim 4 wherein the manifold comprises an exit through which the gas flows, and the method further comprises positioning the exit from about 0.005 to 0.010 inch above the surface of a disk that is being used in the electrical testing.

8. The method of claim 1 wherein the head and equipment used for the electrical testing are exposed to the ambient atmosphere.

9. The method of claim 1 wherein the electrical testing comprises dynamic electrical testing.

10. The method of claim 8 wherein the head is surrounded by a shroud while directing the flow of gas and subjecting the head to the electrical testing.

11. A device for testing a head to be used in a sealed disk drive to read/write data of a storage disk, the device comprising:
a manifold having an opening for providing a flow of gas from a source of gas;
the opening being positioned to direct the flow of gas to a surface of a storage disk positioned adjacent to the head;
the manifold not to be used in the sealed disk drive.

12. The device of claim 11 wherein the head and manifold are mounted on a head gimbal assembly holder not to be used in the sealed disk drive.

13. The device of claim 11 wherein the manifold includes a plurality of apertures extending radially relative to the disk.

14. The device of claim 11 further comprising tubing constructed to deliver the gas to the manifold.

15. The device of claim 14 wherein said tubing comprises square tubing.

16. The method of claim 6 wherein the predetermined time is less than 30 seconds.

17. The method of claim 6 wherein the predetermined time is less than 15 seconds.

18. A method of testing a head to be used in a sealed disk drive, comprising directing a flow of helium from a manifold across the head, between the head and a disk, while subjecting the head to dynamic electrical testing, wherein the sealed disk drive excludes the manifold.

19. The method of claim 18 further comprising causing the helium to flow at a flow rate of from about 40 to 60 ft$^3$/hr.

20. The method of claim 18 further comprising causing the helium to flow across the head for a predetermined time substantially equal to the time required for the dynamic electrical testing.

21. The method of claim 18 wherein the manifold comprises an exit through which the helium flows, and the method further comprises positioning the exit from about 0.005 to 0.010 inch above the surface of a disk that is being used in the dynamic electrical testing.

22. The method of claims 4 or 18 wherein the manifold comprises a two piece assembly.

23. The method of claims 4 or 18 wherein the manifold comprises an angled bore.

24. The device of claim 11 wherein the manifold comprises a two piece assembly.

25. The device of claim 11 wherein the manifold comprises an angled bore through which the gas flows.

26. A method of making a disk drive, comprising the following steps in the sequence set forth:
positioning a head relative to a disk;
directing a gas at the disk while rotating the disk such that the gas is dragged across the head between the head and the disk and while electrically testing the head using the disk; and
sealing the head in the disk drive.

27. The method of claim 26 wherein directing the gas forms a curtain of the gas that is localized to a slider-disk boundary layer.

28. The method of claim 26 wherein directing the gas blocks incoming air from being dragged between the head and the disk.

29. The method of claim 26 wherein directing the gas blocks incoming air from mixing with the gas between the head and the disk.

30. The method of claim 26 including directing the gas at an angle perpendicular to a surface of the disk that faces towards the head.

31. The method of claim 26 including directing the gas an angle perpendicular to a surface of the head that faces towards the disk.

32. The method of claim 26 including directing the gas through a manifold aperture positioned from about 0.005 to 0.010 inch above a surface of the disk that faces towards the head.

33. The method of claim 26 including directing the gas through a plurality of manifold apertures arranged as a single row that extends radially relative to the disk.

34. The method of claim 26 including directing the gas through a plurality of manifold apertures arranged as a U-shape.

35. The method of claim 26 including directing the gas at a flow rate of from about 40 to 60 ft$^3$/hr.

36. The method of claim 26 including directing the gas for less than 30 seconds.

37. The method of claim 26 including directing the gas for less than 15 seconds.

38. The method of claim 26 including directing the gas and electrically testing the head for substantially equal amounts of time.

39. The method of claim 26 wherein the gas is helium.

40. The method of claim 26 including sealing the head and the gas in the disk drive.

41. A method of making a disk drive, comprising the following steps in the sequence set forth:
providing a head that includes an air-bearing surface;
positioning the head relative to a disk such that the air-bearing surface faces towards a surface of the disk;
directing helium through tubing at the disk surface while rotating the disk such that the disk rotation drags the helium across the air-bearing surface between the air-bearing surface and the disk surface and while dynamically electrically testing the head using the disk; and
sealing the head and helium in the disk drive.

42. The method of claim 41 wherein directing the helium blocks incoming air from being dragged between the air-bearing surface and the disk surface.

43. The method of claim 41 wherein directing the helium blocks incoming air from mixing with the helium between the air-bearing surface and the disk surface.

44. The method of claim 41 including directing the helium at an angle perpendicular to the disk surface before the helium strikes the disk surface.

45. The method of claim 41 including directing the helium through a manifold aperture positioned from about 0.005 to 0.010 inch above the disk surface.

46. The method of claim 41 including directing the helium through a plurality of manifold apertures arranged as a single row that extends radially relative to the disk surface.

47. The method of claim 41 including directing the helium through a plurality of manifold apertures arranged as a U-shape.

48. The method of claim 41 including directing the helium at a flow rate of from about 40 to 60 ft$^3$/hr.

49. The method of claim 41 including directing the helium for less than 30 seconds.

50. The method of claim 41 including directing the helium for less than 15 seconds.

51. The method of claim 41 including directing the helium and dynamically electrically testing the head for substantially equal amounts of time.

52. A method of making a disk drive, comprising the following steps in the sequence set forth:

providing a head that includes an air-bearing surface;

positioning the head relative to a disk such that the air-bearing source faces towards a surface of the disk;

directing helium at the disk surface from a gas source that remains external to the disk drive while rotating the disk such that the disk rotation drags the helium across the air-bearing surface between the air-bearing surface and the disk surface and while dynamically electrically testing the head using the disk; and sealing the head and helium in the disk drive.

53. The method of claim 52 wherein directing the helium blocks incoming air from being dragged between the air-bearing surface and the disk surface.

54. The method of claim 52 wherein directing the helium blocks incoming air from mixing with the helium between the air-bearing surface and the disk surface.

55. The method of claim 52 including directing the helium at an angle perpendicular to the disk surface before the helium strikes the disk surface.

56. The method of claim 52 including directing the helium through a manifold aperture positioned from about 0.005 to 0.010 inch above the disk surface.

57. The method of claim 52 including directing the helium through a plurality of manifold apertures arranged as a single row that extends radially relative to the disk surface.

58. The method of claim 52 including directing the helium through a plurality of manifold apparatus arranged as a U-shape.

59. The method of claim 52 including directing the helium at a flow rate of from about 40 to 60 $ft^3$/hr.

60. The method of claim 52 including directing the helium for less than 30 seconds.

61. The method of claim 52 including directing the helium for less than 15 seconds.

62. The method of claim 52 including directing the helium and dynamically electrically testing the head for substantially equal amounts of time.

* * * * *